United States Patent
Leavy et al.

(10) Patent No.: US 9,832,134 B2
(45) Date of Patent: *Nov. 28, 2017

(54) AUTOMATIC ADJUSTING OF REPUTATION THRESHOLDS IN ORDER TO CHANGE THE PROCESSING OF CERTAIN PACKETS

(71) Applicants: Nicholas Read Leavy, London (GB); James William Heary, Littleton, CO (US)

(72) Inventors: Nicholas Read Leavy, London (GB); James William Heary, Littleton, CO (US)

(73) Assignee: Cisco Technology, Inc, San Jose, CA (US)

( * ) Notice: Subject to any disclaimer, the term of this patent is extended or adjusted under 35 U.S.C. 154(b) by 330 days.

This patent is subject to a terminal disclaimer.

(21) Appl. No.: 14/319,811

(22) Filed: Jun. 30, 2014

(65) Prior Publication Data

US 2014/0313891 A1 Oct. 23, 2014

Related U.S. Application Data

(63) Continuation of application No. 12/705,564, filed on Feb. 12, 2010, now Pat. No. 8,797,866.

(51) Int. Cl.
*H04L 12/801* (2013.01)
*H04L 12/26* (2006.01)
(Continued)

(52) U.S. Cl.
CPC .......... *H04L 47/29* (2013.01); *H04L 43/0876* (2013.01); *H04L 43/16* (2013.01);
(Continued)

(58) Field of Classification Search
CPC ..... H04L 47/29; H04L 43/0876; H04L 43/16; H04L 47/10; H04L 63/1458; H04L 47/22; H04L 47/32; H04L 63/1416
(Continued)

(56) References Cited

U.S. PATENT DOCUMENTS 6,574,666 B1 * 6/2003 Dutta ................... H04L 63/0263
709/224
7,436,770 B2 * 10/2008 Sterne ................. H04L 63/0227
726/23

(Continued)

OTHER PUBLICATIONS

Chao et al., "CYSEP—A Cypher-Security Processor for 10GBPS Networks and Beyond," Military Communications Conference, MILCOM 2004, vol. 2, pp. 1114-1122, IEEE, 2004.

(Continued)

*Primary Examiner* — Christine Ng
(74) *Attorney, Agent, or Firm* — The Law Office of Kirk D. Williams (57) ABSTRACT

One embodiment includes a firewall, intrusion prevention, or other device that automatically and dynamically adjusts packets subjected to certain rate limiting based on the reputation level associated with these packets (e.g., based on the reputation score of the source of a packet). In response to measured traffic, one embodiment automatically adjusts the range of reputation scores determining which packets are subjected to this rate limiting (e.g., which packets are possibly dropped), such as, but not limited to increase or decrease the measured traffic. For example, packet traffic with a worse reputation can be singled out for this rate limiting during a period of increased traffic, and then when the measured traffic subsides, the range of reputation scores can be correspondingly changed to allow more measured traffic.

18 Claims, 4 Drawing Sheets

(51) Int. Cl.
*H04L 12/815* (2013.01)
*H04L 12/823* (2013.01)
*H04L 29/06* (2006.01)

(52) U.S. Cl.
CPC .............. *H04L 47/10* (2013.01); *H04L 47/22* (2013.01); *H04L 63/1458* (2013.01); *H04L 47/32* (2013.01); *H04L 63/1416* (2013.01)

(58) Field of Classification Search
USPC ..... 370/230, 230.1, 231, 232, 235, 252, 389
See application file for complete search history.

(56) References Cited

U.S. PATENT DOCUMENTS

| | | | | |
|---|---|---|---|---|
| 7,526,807 | B2* | 4/2009 | Chao | H04L 63/1408 726/23 |
| 7,583,637 | B2* | 9/2009 | Lau | H04L 1/0002 370/332 |
| 7,703,094 | B2* | 4/2010 | Mongkolsmai | G06F 11/3466 718/100 |
| 7,832,009 | B2* | 11/2010 | Wang | H04L 63/101 370/241 |
| 7,936,670 | B2* | 5/2011 | Cazares | H04L 12/4666 370/230 |
| 8,006,303 | B1* | 8/2011 | Dennerline | H04L 63/1408 726/23 |
| 8,797,866 | B2* | 8/2014 | Leavy | H04L 43/0876 370/232 |
| 2003/0126080 | A1* | 7/2003 | Ogmen | G06Q 20/02 705/40 |
| 2005/0018618 | A1* | 1/2005 | Mualem | H04L 63/1458 370/252 |
| 2005/0152375 | A1 | 7/2005 | An et al. | |
| 2006/0067231 | A1* | 3/2006 | Ikoma | H04L 49/90 370/235 |
| 2007/0280114 | A1* | 12/2007 | Chao | H04L 43/0888 370/235.1 |
| 2008/0109902 | A1* | 5/2008 | Grosse | H04L 63/145 726/22 |
| 2009/0122699 | A1 | 5/2009 | Alperovitch et al. | |
| 2010/0125900 | A1* | 5/2010 | Dennerline | H04L 63/0227 726/13 |

OTHER PUBLICATIONS

Kim et al., "PacketScore: Statistical-based Overload Control against Distributed Denial-of-Service Attacks," INFOCOM 2004, pp. 2594-2604, IEEE, 2004.
James Heary, "Shields Up! Time to Start Blocking with your Cisco IPS Sensors," NetworkWorld.com Community, Oct. 5, 2009, 4 pages.
"Reputation scoring changes the enterprise security game," Computerworld, Apr. 3, 2009, 5 pages.
"IronPort Web Reputation: Protect and Defend Against URL-Based Threats," White Paper, IronPort, Feb. 2008, 8 pages.
PCT International Search Report and The Written Opinion of the International Searching Authority for PCT Application PCT/US2011/023783, ISA/EPO, dated May 27, 2011 (fifteen pages).
PCT International Preliminary Report on Patentability for PCT Application PCT/US2011/023783, ISA/EPO, dated Aug. 23, 2012 (ten pages).
"Response to EPO Communication to Provide Comments on PCT Preliminary Report, on Patentability" dated Feb. 15, 2013, EP Application 11704886.8, European Patent Office, Munich, Germany, (ten pages).
Communication pursuant to Article 94(3) EPC, Aug. 3, 2016, EP Application No. 11 704 886.8-1853, European Patent Office, Netherlands (five pages).

* cited by examiner

AUTOMATIC ADJUSTING OF REPUTATION THRESHOLDS IN ORDER TO CHANGE THE PROCESSING OF CERTAIN PACKETS

CROSS-REFERENCE TO RELATED APPLICATIONS

This application is a continuation of U.S. patent application Ser. No. 12/705,564, filed Feb. 12, 2010, which is hereby incorporated by reference in its entirety.

TECHNICAL FIELD

The present disclosure relates generally to a networked device, such as, but not limited to a firewall or a device implementing firewall functionality.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

A common attack in the Internet is a coordinated distributed denial of service (DDoS) attack, in which many computers around the world simultaneously try to make apparently legitimate requests of a server, blocking access from regular clients. The computers mounting the attack are frequently members of botnets—that is regular computers that have unwittingly been compromised by malware. Since these are actual clients, from a broad array of networks, there is no simple way to sort the good requests from the bad. Frequently the only option is to manually block whole swaths of addresses, even though a lot of legitimate traffic is included in those swaths. An extreme example was the DDoS attack mounted against Estonia, in which the service providers ended up blocking all IP address not in Estonia—essentially they disconnected the Estonian Internet from the rest of the world.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with automatic adjusting of reputation thresholds in order to change the processing of certain packets, such as, but not limited to packets whose source has a corresponding reputation score worse than a new reputation threshold. This processing typically includes one form of rate limiting, such as, but not limited to, the not necessarily non-overlapping, extensible groups of: flow control, Quality of Service (Qos) marking, dropping, policing, additional inspection (possibly including deep packet inspection) and reactive processing of packets, etc.

In one embodiment, a firewall, intrusion prevention or other device automatically and dynamically adjusts packets subjected to certain rate limiting based on the reputation level associated with their source. When measured traffic increases beyond a desired amount, the range of reputation scores causing their associated packets to be subjected to this rate limiting is adjusted to throttle the measured traffic to fall within desired limits. In this manner, packet traffic with a worse reputation can be singled out for this rate limiting during a period of increased traffic. When the measured traffic subsides, the range of reputation scores can be correspondingly changed to allow more measured traffic.

One embodiment includes a method performed by a particular machine, such as, but not limited to a firewall or intrusion prevention system (IPS). In one embodiment, the method includes: rate limiting, by the particular networked machine, of a first plurality of packets of a greater plurality of packets, wherein packets received by the particular networked machine are identified as being in the first plurality of packets when their source has a worse reputation score than a predetermined reputation score threshold; and wherein packets received by the particular networked machine are not identified as being in the first plurality of packets when their source has a better reputation score than the predetermined reputation score threshold. In response to measured traffic of the greater plurality of packets equaling or exceeding one or more predetermined traffic measurement thresholds: automatically adjusting, by the particular networked machine, the reputation score threshold to a better reputation score thus expanding the first plurality of packets to now include packets associated with a higher reputation score on which the particular networked machines performs said rate limiting.

In one embodiment, said measured traffic is based on one or more from the group consisting of: a rate of a number of packets in the greater plurality of packets, a rate of connection attempts by the greater plurality of packets; and a data rate of the greater plurality of packets. One embodiment includes determining a particular reputation score for a particular packet of the first plurality of packets based on a source address of the particular packet. One embodiment includes determining a particular reputation score for a particular packet of the first plurality of packets based on a source address of the particular packet and operating system fingerprinting of the particular packet. One embodiment includes determining a particular reputation score for a particular packet of the first plurality of packets based on a domain associated with a source address of the particular packet. In one embodiment, said determining the particular reputation score for the particular packet of the first plurality of packets based on the domain associated with the source address of the particular packet includes: performing a reverse domain name service lookup operation on the source address of the particular packet. In one embodiment, the particular networked machine is a firewall. In one embodiment, said rate limiting by the particular networked machine of an identified packet includes one or more rate limiting operations from a group consisting of dropping the identified packet, diverting the identified packet for further processing to determine how to rate limit, performing Quality of Service (QoS) rate limiting of the identified packet based on its type of service. In one embodiment, said measured traffic of the greater plurality of packets is made after said rate limiting of the first plurality of packets such that packets in the greater plurality of packets dropped prior to said measurement of traffic are not included in said measured traffic. In one embodiment, in response to said measured traffic of the greater plurality of packets equaling or dropping below a second predetermined traffic measurement threshold: automatically adjusting, by the particular networked machine, the reputation score threshold to a worse reputation score thus contracting the first plurality of packets on which the particular networked machines performs said rate limiting.

2. Description

Disclosed are, inter alia, methods, apparatus, computer-storage media, mechanisms, and means associated with automatic adjusting of reputation thresholds in order to change the processing of certain packets, such as, but not limited to packets whose source has a corresponding reputation score worse than a new reputation threshold. This processing typically includes one form of rate limiting, such as, but not limited to, the not necessarily non-overlapping, extensible groups of: flow control, Quality of Service (Qos) marking, dropping, policing, additional inspection (possibly including deep packet inspection) and reactive processing of packets, etc.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations within the scope and spirit of the invention, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the invention. Note, the term "apparatus" is used consistently herein with its common definition of an appliance or device.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the team "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

One embodiment includes a method performed by a particular networked machine, the method comprising: rate limiting, by the particular networked machine, of a first plurality of packets of a greater plurality of packets, wherein packets received by the particular networked machine are identified as being in the first plurality of packets when their source has a worse reputation score than a predetermined reputation score threshold; and wherein packets received by the particular networked machine are not identified as being in the first plurality of packets when their source has a better reputation score than the predetermined reputation score threshold; and in response to measured traffic of the greater plurality of packets equaling or exceeding one or more predetermined traffic measurement thresholds: automatically adjusting, by the particular networked machine, the reputation score threshold to a better reputation score thus expanding the first plurality of packets to now include packets associated with a higher reputation score on which the particular networked machines performs said rate limiting.

In one embodiment, said measured traffic is based on one or more from the group consisting of: a rate of a number of packets in the greater plurality of packets, a rate of connection attempts by the greater plurality of packets; and a data rate of the greater plurality of packets. One embodiment includes determining a particular reputation score for a particular packet of the first plurality of packets based on a source address of the particular packet. One embodiment includes determining a particular reputation score for a particular packet of the first plurality of packets based on a source address of the particular packet and operating system fingerprinting of the particular packet. One embodiment includes determining a particular reputation score for a particular packet of the first plurality of packets based on a domain associated with a source address of the particular packet. In one embodiment, said determining the particular reputation score for the particular packet of the first plurality of packets based on the domain associated with the source address of the particular packet includes: performing a reverse domain name service lookup operation on the source address of the particular packet.

In one embodiment, the particular networked machine is a firewall. In one embodiment, said rate limiting by the particular networked machine of an identified packet includes one or more rate limiting operations from a group consisting of: dropping the identified packet, diverting the identified packet for further processing to determine how to rate limit, performing Quality of Service (QoS) rate limiting of the identified packet based on its type of service. In one embodiment, said measured traffic of the greater plurality of packets is made after said rate limiting of the first plurality of packets such that packets in the greater plurality of packets dropped prior to said measurement of traffic are not included in said measured traffic. In one embodiment, in response to said measured traffic of the greater plurality of packets equaling or dropping below a second predetermined traffic measurement threshold: automatically adjusting, by the particular networked machine, the reputation score threshold to a worse reputation score thus contracting the first plurality of packets on which the particular networked machines performs said rate limiting.

One embodiment includes an apparatus, comprising: a rate limiter configured for rate limiting of a first plurality of packets of a greater plurality of packets, wherein packets received by the apparatus are identified as being in the first plurality of packets when their source has a worse reputation score than a predetermined reputation score threshold; and wherein packets received by the apparatus are not identified as being in the first plurality of packets when their source has a better reputation score than the predetermined reputation score threshold; a controller responsive to measured traffic of the greater plurality of packets equaling or exceeding a predetermined traffic measurement threshold, with said response including: automatically adjusting the reputation score threshold to a better reputation score thus expanding the first plurality of packets to now include packets associated with a higher reputation score on which the particular networked machines performs said rate limiting; and one or more rate monitors configured for determining said measured traffic.

In one embodiment, said measured traffic is based on one or more from the group consisting of: a rate of a number of packets in the greater plurality of packets, a rate of connection attempts by the greater plurality of packets; and a data rate of the greater plurality of packets. In one embodiment, the apparatus networked machine is a firewall. In one embodiment, said rate limiting by the particular networked machine of an identified packet includes one or more rate limiting operations from a group consisting of: dropping the identified packet, diverting the identified packet for further processing to determine how to rate limit, performing Quality of Service (QoS) rate limiting of the identified packet based on its type of service. In one embodiment, said one or more rate monitors are communicatively coupled to receive packets after passing through the rate limiter such that packets in the greater plurality of packets dropped prior to reaching said one or more rate monitors are not included in said measured traffic. In one embodiment, the controller is configured to automatically adjust the reputation score threshold to a worse reputation score thus contracting the first plurality of packets in response to said measured traffic equaling or dropping below a second predetermined traffic measurement threshold.

One embodiment includes a method performed by a particular networked machine, the method comprising: repeatedly: receiving a particular packet; applying firewall functionality to said received particular packet, said firewall functionality including rate limiting of particular packets having a source with a reputation score worse than a current reputation score threshold; and forwarding non-dropped said received particular packet from the particular networked machine; and repeatedly: measuring at least a portion of outbound traffic from the particular networked machine; in response to determining that said measured outbound traffic exceeds a corresponding predetermined rate threshold value: dynamically adjusting the current reputation score threshold to a reputation score level better than that current of the current reputation score threshold in order to cause said measured outbound traffic to no longer exceed the corresponding predetermined rate threshold value.

In one embodiment, said received particular packets belong to a particular client; and wherein said measured outbound traffic is that of the particular client. In one embodiment, said firewall functionality includes identifying the reputation score for the particular packet based on one or more from the group consisting of: a source address of the particular packet; the source address of the particular packet and operating system fingerprinting of the particular packet; and a domain associated with the source address of the particular packet. In one embodiment, said rate limiting of the particular packet includes one or more rate limiting operations from a group consisting of: dropping the particular packet, diverting the particular packet for further processing to determine how to rate limit, performing Quality of Service (QoS) rate limiting of the particular packet based on its type of service.

Figure 1:
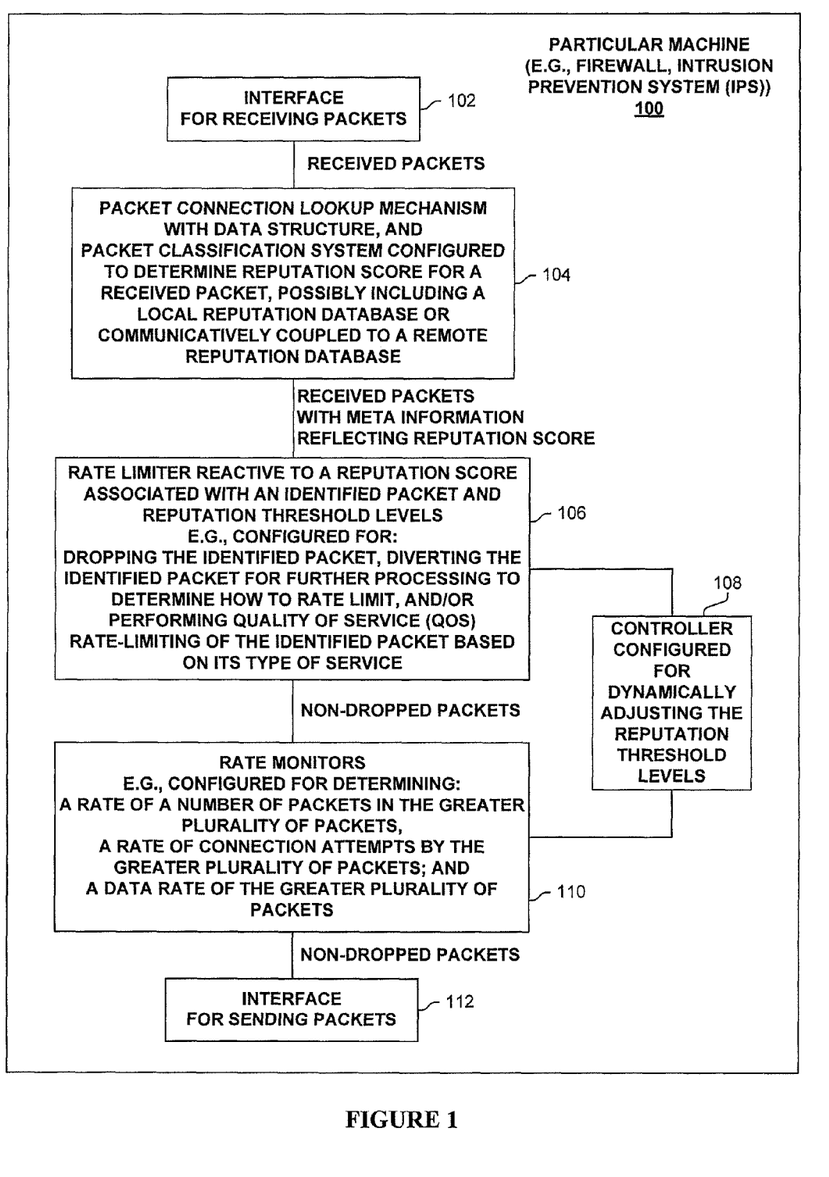
FIG. 1 illustrates a particular machine operating according to one embodiment.

Expressly turning to the figures, FIG. 1 illustrates a particular machine 100, such as, but not limited to a firewall, an intrusion prevention system, or other device implementing firewall functionality. Note, the operation of one embodiment of FIG. 1 is further described in conjunction with FIGS. 2, 3 and/or 4.

As shown, particular machine 100 includes an interface 102 configured for receiving packets.

Particular machine 100 also includes component 104, which includes: a packet connection lookup mechanism with a data structure (e.g., configured storing a flow table) configured for identifying whether a packet belongs to a current flow (e.g., based on a hashing or other lookup operation); and if so, information about the flow including a reputation score (e.g., the score itself or some representation or encoding thereof) of the source of the flow. If the flow is not located in the data structure, then a packet classification system is typically used to classify the packet (e.g., based on the standard five-tuple of source address, source port, destination address, destination port, and packet type), as well as to identify a current reputation score of the source of the packet/flow. In one embodiment, a lookup operation is performed on a local or remote reputation database, such as, but not limited to, based on a source address of the packet; the source address of the packet and operating system fingerprinting of the packet; or a domain associated with the source address of the particular packet (e.g., after performing a reverse domain name server (DNS) lookup on the source address of the packet such as to counteract IP address flux). The data structure is typically then updated with the flow information and reputation information, such that a next packet associated with the same flow can be readily identified based on an initial lookup operation and its associated stateful characteristics and reputation score can be readily retrieved from the data structure.

Particular machine 100 also includes a rate limiter 106, which is reactive to a reputation score identified for a packet and one or more current reputation score threshold values. In one embodiment, rate limiter 106 is configured to rate limit by, but not limited to, performing one or more rate limiting operations of: dropping the particular packet, diverting the particular packet for further processing to determine how to rate limit, performing Quality of Service (QoS) rate limiting of the particular packet based on its type of service. In one embodiment, rate limiter 106 uses one or more reputation levels which identify sets or bands or reputation levels for which certain types of rate limiting is to be performed thereon. For example, when a reputation score of a packet (e.g., the reputation score associated with the source of the packet) is worse than a current threshold amount, then that traffic is rate limited of a first type, with packets having a reputation score better than the current threshold amount not being so subject to the rate limiting of a first type. Thus, traffic with a worse reputation can be subjected to rate limiting. Also, one embodiment uses multiple thresholds, with packets with correspondingly worse reputation levels subjected to correspondingly harsher rate limiting.

Particular machine 100 also includes rate monitors 110 configured for determining one or more measured rates, such as, but not limited to: a rate of a number of packets, a rate of connection attempts; and/or a data rate of packets.

Particular machine 100 also includes controller 108 configured for dynamically adjusting the one or more reputation threshold values. In one embodiment, when one of the measured traffic rates exceeds a predetermined threshold value (e.g., the desired maximum amount of traffic or some value less than that to prevent overshooting the desired rate), one or more reputation threshold values are adjusted to cause additional packets to be subjected to certain rate limiting where some of these packets would not have been so subjected before said adjustment of the one or more reputation threshold values. In other words, if a measured rate exceeds a desired level, then additional rate limiting is required. One embodiment dynamically focuses this additional rate limiting at least in part on reputation scores in order to bring the measured rate back below a desired level.

For example, a customer might have a communications link over which it desires no more measured traffic than a predetermined amount. When below this amount, rate-limiting of desirable traffic is not performed (of course, some embodiments will always rate limit certain types of traffic or traffic corresponding to a reputation level worse than some amount). However, when measured traffic exceeds a predetermined amount, the particular machine needs to rate limit this otherwise desirable traffic. One embodiment automatically differentiates and correspondingly rate limits packets of this otherwise desirable traffic based on their reputation scores in order to bring the measured traffic back in line with the predetermined amount. This dynamic adjustment of the reputation level threshold(s) may be a single adjustment, or may take multiple adjusts reacting to on subsequent measured traffic. Further, once the measured traffic drops below a corresponding one or more second threshold values, the reputation level threshold(s) will be adjusted to stop certain packets with corresponding reputation levels from being subjected to the rate limiting dynamically put in place during this period of increased measured traffic.

Particular machine 100 also includes interface 112 configured for sending out packets which have not been dropped (e.g., discarded, part of blocked connections, etc.).

Figure 2:
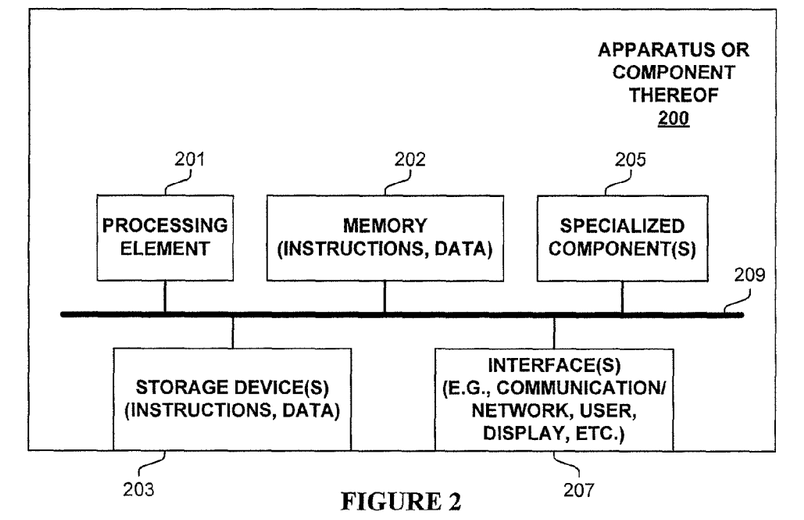
FIG. 2 illustrates an apparatus or component thereof used in one embodiment.

FIG. 2 is block diagram of an apparatus or component 200 used in one embodiment associated with automatic adjusting of reputation thresholds for rate limiting of packets. In one embodiment, system or component 200 performs one or more processes corresponding to one of the flow diagrams illustrated or otherwise described herein.

In one embodiment, apparatus or component 200 includes one or more processing elements 201, memory 202, storage device(s) 203, specialized component(s) 205 (e.g. optimized hardware such as for performing lookup operations, etc.), and interface(s) 207 for communicating information (e.g., sending and receiving packets, user-interfaces, displaying information, etc.), which are typically communicatively coupled via one or more communications mechanisms 209, with the communications paths typically tailored to meet the needs of the application. In one embodiment apparatus or component 200 corresponds to, or is part of, particular machine 100 of FIG. 1.

Various embodiments of apparatus or component 200 may include more or less elements. The operation of apparatus or component 200 is typically controlled by processing element(s) 201 using memory 202 and storage device(s) 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element(s) 201 and/or data which is manipulated by processing element(s) 201 for implementing functionality in accordance with an embodiment. Storage device(s) 203 are another type of computer-readable medium, and typically comprise solid state storage media, disk drives, diskettes, networked services, tape drives, and other storage devices. Storage device(s) 203 typically store computer-executable instructions to be executed by processing element(s) 201 and/or data which is manipulated by processing element(s) 201 for implementing functionality in accordance with an embodiment.

Figure 3:
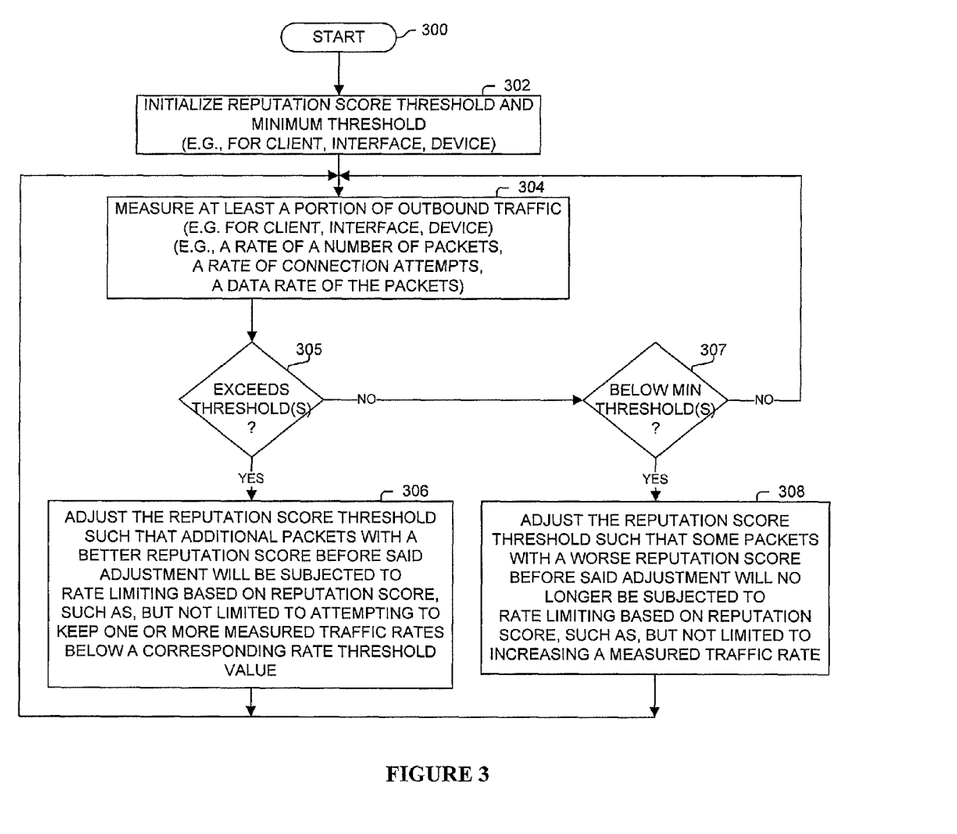
FIG. 3 illustrates a process performed in one embodiment.

FIG. 3 illustrates a process performed in one embodiment. Processing begins with process block 300. In process block 302, a reputation score threshold and minimum reputation score threshold are initialized. These reputation score thresholds may correspond to a client, interface or entire device, or a portion thereof. Depending on the embodiment and use thereof, a particular machine may have different reputation level threshold(s) and measured traffic value(s) for different clients, interfaces, or portions of the entire device.

In process block 304, at least a portion of the outbound traffic is measured (e.g., correspond to a client, interface or entire device, or a portion thereof), such as, but not limited to, measuring a rate of a number of packets, a rate of connection attempts; and/or a data rate of packets. As determined in process block 305, if a measured rate exceeds a corresponding rate threshold value, then in process block 306, the reputation score threshold is adjusted such that additional packets with a better reputation score before said adjustment will be subjected to rate limiting based on reputation score, such as, but not limited to attempting to keep one or more measured traffic rates below a corresponding rate threshold value. Otherwise, as determined in process block 307, if the traffic level has dropped below a minimum threshold value, then, in process block 308, the dynamic reputation level adjustment will backoff to cause less traffic to be subjected to rate limiting than currently is so subjected, thus, typically increasing one or more measured traffic values. Processing returns to process block 304.

Figure 4:
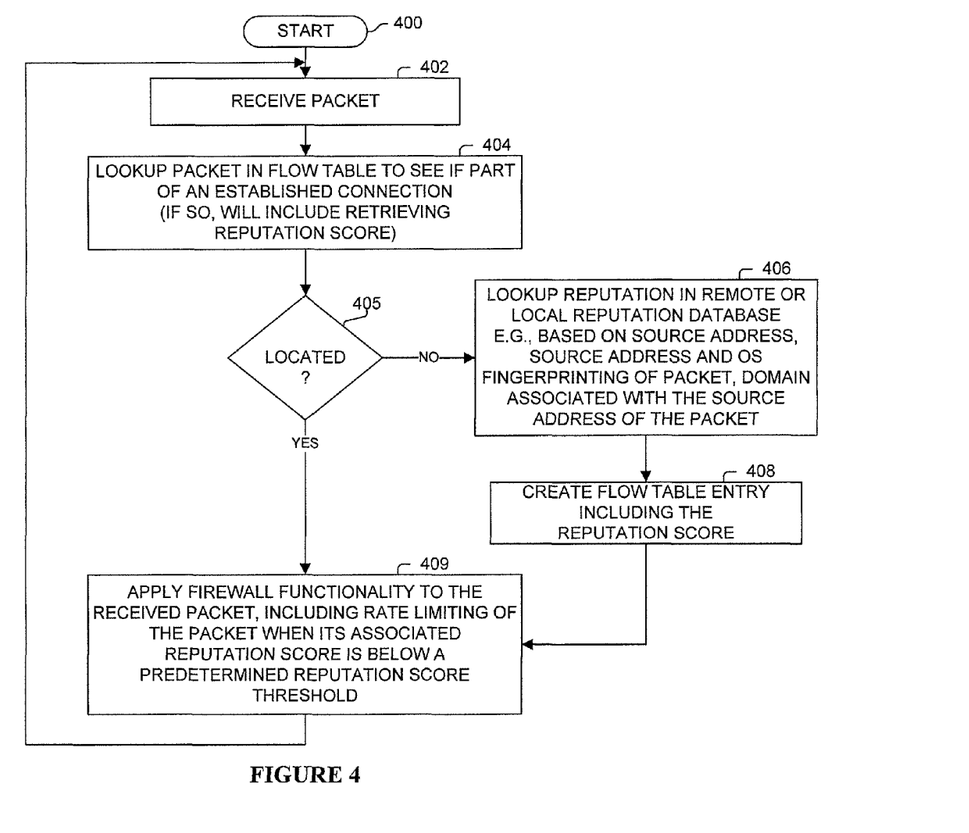
FIG. 4 illustrates a process performed in one embodiment.

FIG. 4 illustrates a process performed in one embodiment. Processing begins with process block 400. In process block 402, a packet is received. In process block 404, a lookup operation is performed on the packet (e.g., in a flow table) to identify if the packet is part of an existing flow, and if so, corresponding information for performing firewall functionality will be retrieved including a reputation score corresponding to a source of the packet.

As determined in process block 405, if the lookup operation did not determine that the packet belonged to a preexisting connection, then in process block 406, the reputation corresponding to the source of the packet is performed on a local or remote reputation database. In one embodiment, this lookup operation is performed based on a source address of the packet; the source address of the packet and operating system fingerprinting of the packet; or a domain associated with the source address of the particular packet (e.g., after performing a reverse domain name server (DNS) lookup on the source address of the packet such as to counteract IP address flux). In process block 408, a flow table entry including the identified reputation score is created.

Next, in process block 409, firewall functionality is applied to the received packet, which includes rate limiting of the packet when its associated reputation score is worse than a predetermined reputation score threshold. Processing returns to process block 402.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method performed by a particular networked machine, the method comprising:
   rate limiting, by the particular networked machine, of a first plurality of packets of a greater plurality of packets, wherein packets received by the particular networked machine are identified as being in the first plurality of packets when their source has a worse reputation score than a predetermined reputation score threshold; and wherein packets received by the particular networked machine are not identified as being in the first plurality of packets when their source has a better reputation score than the predetermined reputation score threshold; and
   in response to measured traffic: automatically adjusting, by the particular networked machine, the reputation score threshold to a better reputation score thus expanding the first plurality of packets to now include packets associated with a higher reputation score on which the particular networked machines performs said rate limiting.

2. The method of claim 1, wherein said measured traffic is based on one or more from the group consisting of: a rate of a number of packets in the greater plurality of packets, a rate of connection attempts by the greater plurality of packets; and a data rate of the greater plurality of packets.

3. The method of claim 1, including determining a particular reputation score for a particular packet of the first plurality of packets based on a source address of the particular packet.

4. The method of claim 1, including determining a particular reputation score for a particular packet of the first plurality of packets based on a source address of the particular packet and operating system fingerprinting of the particular packet.

5. The method of claim 1, including determining a particular reputation score for a particular packet of the first plurality of packets based on a domain associated with a source address of the particular packet.

6. The method of claim 5, wherein said determining the particular reputation score for the particular packet of the first plurality of packets based on the domain associated with the source address of the particular packet includes: performing a reverse domain name service lookup operation on the source address of the particular packet.

7. The method of claim 1, wherein the particular networked machine is a firewall.

8. The method of claim 1, wherein said rate limiting by the particular networked machine of an identified packet includes one or more rate limiting operations from a group consisting of: dropping the identified packet, diverting the identified packet for further processing to determine how to rate limit, performing Quality of Service (QoS) rate limiting of the identified packet based on its type of service.

9. The method of claim 1, wherein said measured traffic is made after said rate limiting of the first plurality of packets such that packets in the greater plurality of packets dropped prior to said measurement of traffic are not included in said measured traffic.

10. The method of claim 1, wherein in response to a change in said measured traffic: automatically adjusting, by the particular networked machine, the reputation score threshold to a worse reputation score thus contracting the first plurality of packets on which the particular networked machines performs said rate limiting.

11. The method of claim 1, including performing a lookup operation on a reputation database remote from the particular networked machine to acquire the reputation score of the source of a particular packet of the first plurality of packets.

12. An apparatus, comprising:
   a rate limiter configured for rate limiting of a first plurality of packets of a greater plurality of packets, wherein packets received by the apparatus are identified as being in the first plurality of packets when their source has a worse reputation score than a predetermined reputation score threshold; and wherein packets received by the apparatus are not identified as being in the first plurality of packets when their source has a better reputation score than the predetermined reputation score threshold;
   a controller responsive to measured traffic including: automatically adjusting the reputation score threshold to a better reputation score thus expanding the first plurality of packets to now include packets associated with a higher reputation score on which the apparatus performs said rate limiting; and
   one or more rate monitors configured for determining said measured traffic.

13. The apparatus of claim 12, wherein said measured traffic is based on one or more from the group consisting of: a rate of a number of packets in the greater plurality of packets, a rate of connection attempts by the greater plurality of packets; and a data rate of the greater plurality of packets.

14. The apparatus of claim 12, wherein the apparatus is a firewall.

15. The apparatus of claim 12, wherein said rate limiting by the apparatus of an identified packet includes one or more rate limiting operations from a group consisting of: dropping the identified packet, diverting the identified packet for further processing to determine how to rate limit, performing Quality of Service (QoS) rate limiting of the identified packet based on its type of service.

16. The apparatus of claim 12, wherein said one or more rate monitors are communicatively coupled to receive packets after passing through the rate limiter such that packets in the greater plurality of packets dropped prior to reaching said one or more rate monitors are not included in said measured traffic.

17. The apparatus of claim 12, wherein the controller is configured to automatically adjust the reputation score threshold to a worse reputation score thus contracting the first plurality of packets in response to a change in said measured traffic.

18. The apparatus of claim 12, including an interface configured to acquire the reputation score of the source of a particular packet of the first plurality of packets based on a lookup operation on a reputation database remote from the apparatus.

* * * * *